(12) United States Patent
Inamura et al.

(10) Patent No.: US 12,199,308 B2
(45) Date of Patent: Jan. 14, 2025

(54) BUS BAR PLATE

(71) Applicant: SANYO Electric Co., Ltd., Osaka (JP)

(72) Inventors: Takashi Inamura, Hyogo (JP);
Takashi Yoshida, Hyogo (JP);
Hiroyuki Mihara, Osaka (JP)

(73) Assignee: SANYO Electric Co., Ltd., Osaka (JP)

( * ) Notice: Subject to any disclaimer, the term of this patent is extended or adjusted under 35 U.S.C. 154(b) by 566 days.

(21) Appl. No.: 17/611,126

(22) PCT Filed: Apr. 20, 2020

(86) PCT No.: PCT/JP2020/016988
§ 371 (c)(1),
(2) Date: Nov. 12, 2021

(87) PCT Pub. No.: WO2020/235279
PCT Pub. Date: Nov. 26, 2020

(65) Prior Publication Data
US 2022/0223980 A1    Jul. 14, 2022

(30) Foreign Application Priority Data

May 22, 2019  (JP) .................................. 2019-095815

(51) Int. Cl.
*H01M 50/507*     (2021.01)
*H01M 50/209*     (2021.01)
(Continued)

(52) U.S. Cl.
CPC ....... *H01M 50/507* (2021.01); *H01M 50/209* (2021.01); *H01M 50/50* (2021.01);
(Continued)

(58) Field of Classification Search
None
See application file for complete search history.

(56) References Cited

U.S. PATENT DOCUMENTS

2014/0335393  A1*  11/2014  Wada .................. H01M 50/291
                                                          429/121

FOREIGN PATENT DOCUMENTS

CN          208256772 U       12/2018
CN          112272896 A   *    1/2021   ............. H01G 11/10
(Continued)

OTHER PUBLICATIONS

International Search Report of PCT application No. PCT/JP2020/016988 dated Jul. 14, 2020.
(Continued)

*Primary Examiner* — Amanda C. Walke
(74) *Attorney, Agent, or Firm* — WHDA, LLP (57) ABSTRACT

Each plate unit is disposed corresponding to one battery or to an assembly of several batteries and has terminal openings, through which output terminals provided on corresponding battery are exposed, and coupling mechanism that couples adjacent plate units to each other. Coupling mechanism is made up of male part disposed on one of two adjacent plate units, and female part that is disposed on the other and to which male part is fitted. Male part and female part are fitted to each other across a gap that allows a predetermined amount of displacement of two coupled plate units in stacking direction of batteries.

16 Claims, 8 Drawing Sheets

(51) Int. Cl.
 _H01M 50/50_ (2021.01)
 _H01M 50/503_ (2021.01)
 _H01M 50/553_ (2021.01)
 _H01M 50/569_ (2021.01)

(52) U.S. Cl.
 CPC ....... _H01M 50/503_ (2021.01); _H01M 50/553_ (2021.01); _H01M 50/569_ (2021.01)

(56) References Cited

FOREIGN PATENT DOCUMENTS

| | | | | |
|---|---|---|---|---|
| CN | 112771635 A | * | 5/2021 | .......... H01M 50/209 |
| WO | 2013/161655 | | 10/2013 | |
| WO | WO-2021060219 A1 | * | 4/2021 | |

OTHER PUBLICATIONS

English Translation of Chinese Search Report dated Jan. 5, 2023 for the related Chinese Patent Application No. 202080033767.8.

* cited by examiner

BUS BAR PLATE

TECHNICAL FIELD

The present invention relates to a bus bar plate.

BACKGROUND ART

For example, as a power source for a vehicle or the like that requires a high output voltage, there has been known a battery module formed by electrically connecting a plurality of batteries to each other. In general, in a battery module, a plurality of batteries have been stacked, and adjacent batteries have been electrically connected via a bus bar. Further, for example, as disclosed in PTL 1, the battery module has included a bus bar plate covering a terminal placement surface of a battery stack and supporting the bus bar. By covering the terminal placement surface of the battery stack with the bus bar plate, a creepage distance between the output terminals can be ensured. The bus bar plate can also function as a support plate for supporting a voltage detection line that detects the voltage of each battery.

CITATION LIST

Patent Literature

PTL 1: WO 2013/161655 A

SUMMARY OF THE INVENTION

In recent years, a number of batteries included in a power source tends to increase with the demand for higher capacity of the power source. For achieving the high capacity of the power source, it is conceivable to increase a number of battery modules, but it is more effective in terms of the cost of the power source to increase a number of stacked batteries in one battery module. That is, according to a method of increasing the number of stacked batteries in each battery module while maintaining the number of battery modules, it is possible to increase the capacity of the power source while reducing an increase in a number of components constituting the power source, thereby reducing an increase in cost. As the number of stacked batteries increases, it is naturally necessary to increase the dimensions of the bus bar plate. However, when the bus bar plate is increased in size, warpage is likely to occur particularly at an end part of the bus bar plate. When the bus bar plate is deformed due to the occurrence of warpage in the end part, adverse effects such as difficulties in ensuring the creepage distance between the output terminals and supporting the voltage detection line may occur. For this reason, there is a demand for a bus bar plate that is less likely to be warpage in the end part even when the bus bar plate is increased in size.

In general, batteries tend to expand or contract with use. When the number of stacked batteries increases, a dimensional variation of the battery stack increases, and a load applied to the bus bar plate increases. When an excessive load is applied to the bus bar plate, the bus bar plate may be damaged. Therefore, a bus bar plate that is less likely to be damaged even when the number of stacked batteries is increased is desired.

The present invention has been made in view of such a situation, and an object of the present invention is to provide a bus bar plate capable of coping with an increase in the number of stacked batteries.

One aspect of the present invention is a bus bar plate that covers a surface of a battery stack having a plurality of stacked batteries, the surface being provided with output terminals of each of the plurality of stacked batteries, and supports a bus bar electrically connecting each of the output terminals. The bus bar plate includes a plurality of plate units. Each of the plate units is disposed corresponding to one battery in the plurality of batteries or to an assembly of several batteries and has terminal openings for exposure of the output terminals provided on the corresponding battery and a coupling mechanism that couples adjacent plate units to each other. The terminal openings are provided at both ends of each of the plate units in a direction orthogonal to a stacking direction of the batteries. The coupling mechanism is located between the terminal openings arranged in the direction orthogonal to the stacking direction of the batteries and is made up of a male part disposed on a first plate unit out of the first plate unit and a second plate unit adjacent to each other, and a female part that is disposed on the second plate unit and that the male part is fitted to. The male part and the female part are fitted to each other across a gap that allows a predetermined amount of displacement of the first plate unit and the second plate unit in the stacking direction of the batteries.

Note that any combinations of the above-described configuration elements and configurations obtained by expressing the present invention in the form of a method, apparatus, system and the like are also effective as an aspect of the present invention.

According to the present invention, it is possible to provide a bus bar plate capable of coping with an increase in a number of stacked batteries.

BRIEF DESCRIPTION OF DRAWINGS

FIGS. 7(A) and (B) is view illustrating an assembly process of a battery module according to a first modified example.

DESCRIPTION OF EMBODIMENTS

Hereinafter, the present invention will be described on the basis of preferred exemplary embodiments with reference to the drawings. The exemplary embodiments are not intended to limit the invention but are examples, and all features described in the exemplary embodiments and combinations thereof are not necessarily essential to the invention. The same or equivalent configuration elements, members, and processing illustrated in the drawings are denoted by the same reference numerals, and a redundant description will be omitted as appropriate. The scale and shape of each part illustrated in each drawing are set for convenience in order to facilitate the description and are not limitedly interpreted unless otherwise specified. When terms such as "first" and "second" are used in the present specification or claims, unless otherwise specified, these terms do not represent any order or importance but are intended to distinguish one configuration from another configuration. In each drawing, some members, which are not important for describing the exemplary embodiment, are omitted.

First Exemplary Embodiment

Figure 1:
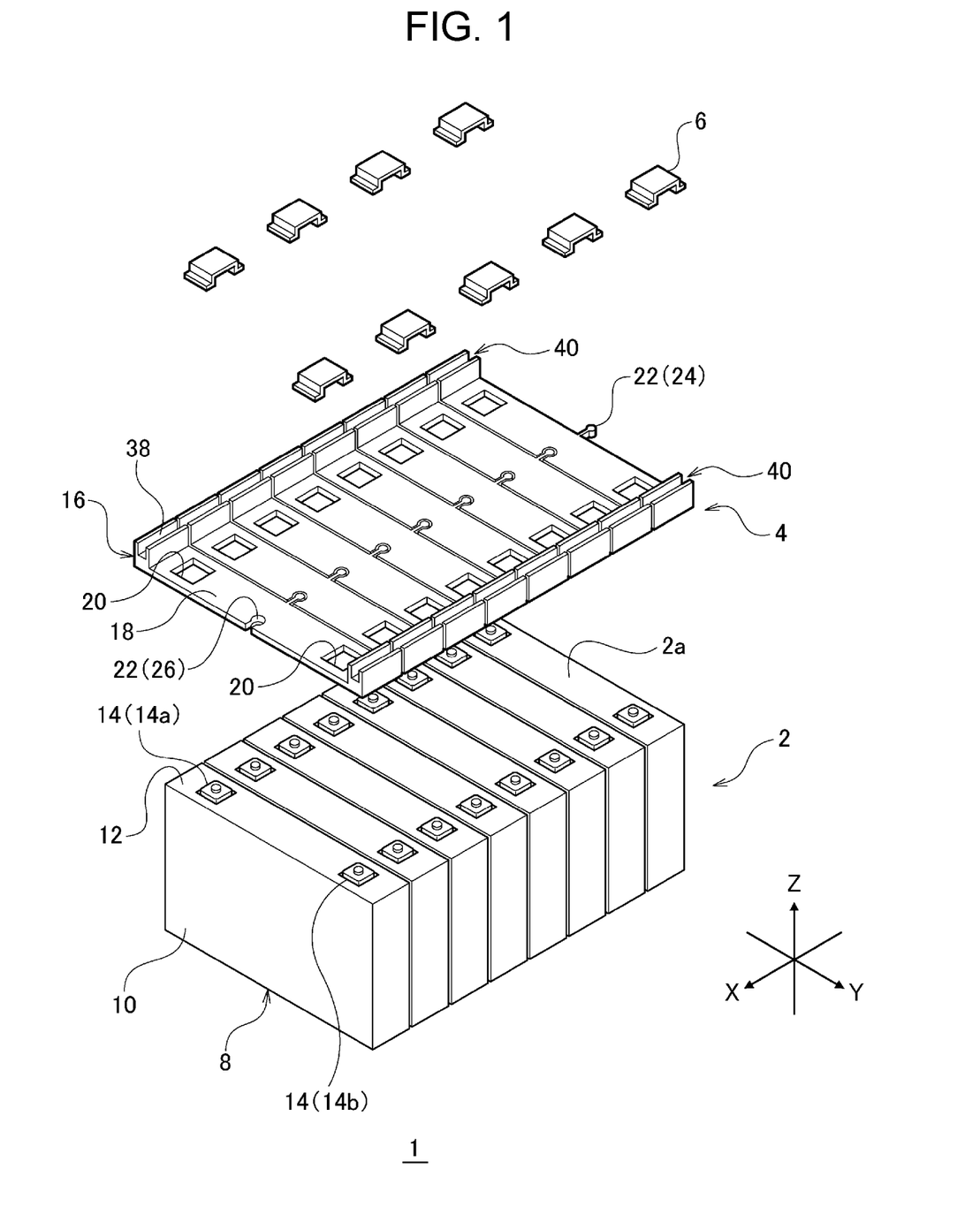
FIG. 1 is an exploded perspective view of a battery module including a bus bar plate according to a first exemplary embodiment.

FIG. 1 is an exploded perspective view of a battery module including a bus bar plate according to a first exemplary embodiment. Battery module 1 includes battery stack 2, bus bar plate 4, and a plurality of bus bars 6. Battery stack 2 has a plurality of stacked batteries 8. Each battery 8 is a rechargeable secondary battery such as a lithium-ion battery, a nickel-metal-hydride battery, or a nickel-cadmium battery. Battery 8 is a so-called prismatic battery and has exterior can 10 in a flat rectangular-parallelepiped shape. Exterior can 10 has a substantially rectangular opening on one surface, and an electrode assembly, an electrolyte, and the like are accommodated in exterior can 10 through the opening. Sealing plate 12 for sealing exterior can 10 is provided in an opening of exterior can 10.

Sealing plate 12 is provided with output terminal 14 of a positive electrode near one end and output terminal 14 of a negative electrode near the other end in the longitudinal direction. The pair of output terminals 14 are electrically connected respectively to the positive electrode plate and the negative electrode plate constituting the electrode assembly. Hereinafter, output terminal 14 of the positive electrode is appropriately referred to as positive electrode terminal 14a, and output terminal 14 of the negative electrode is appropriately referred to as negative electrode terminal 14b. When it is not necessary to distinguish the polarity of output terminal 14, positive electrode terminal 14a and negative electrode terminal 14b are collectively referred to as output terminal 14. Exterior can 10, sealing plate 12, and output terminals 14 are electric conductors and are made of metal, for example. Sealing plate 12 and the opening of exterior can 10 are joined to each other by, for example, laser bonding. Respective output terminals 14 are inserted into through-holes (not illustrated) formed in sealing plate 12. An insulating seal member (not illustrated) is interposed between each output terminal 14 and each through-hole.

In the description of the present exemplary embodiment, for convenience, sealing plate 12 is referred to as the upper surface of battery 8, and the bottom surface of exterior can 10 disposed on the side opposite to sealing plate 12 is referred to as the lower surface of battery 8. Battery 8 has two main surfaces that connect the upper surface and the lower surface of battery 8 to each other. The main surfaces are surfaces having the largest area out of the six surfaces of battery 8. The main surfaces are long side surfaces connected to the long sides of the upper surface and the long sides of the lower surface. Two remaining surfaces except for the upper surface, the lower surface, and the two main surfaces are referred to as the side surfaces of battery 8. These side surfaces are a pair of short side surfaces connected to the short sides of the upper surface and the short sides of the lower surface.

Further, for convenience, the surface of battery stack 2 closer to the upper-surface of battery 8 is referred as the upper surface of battery stack 2, the surface closer to the lower-surface of battery 8 is referred as the lower surface of battery stack 2, and the surface closer to the side surface of battery 8 is referred as the side surface of battery stack 2. These directions and positions are defined for convenience. Therefore, for example, the portion defined as the upper surface in the present invention does not necessarily mean a portion located above the portion defined as the lower surface.

Sealing plate 12 is provided with a safety valve (not illustrated) between the pair of output terminals 14. The safety valve is a mechanism for each battery 8 to eject gas inside the battery. The safety valve is configured to open and release the internal gas when the internal pressure of exterior can 10 rises to a predetermined value or more. The safety valve includes, for example, a thin part, which is provided in a part of sealing plate 12 and is thinner than the other part, and a linear groove formed on the surface of the thin part.

Each battery 8 has an insulating film (not illustrated). The insulating film is, for example, a cylindrical shrink tube, and is heated after exterior can 10 is inserted into the insulating film. As a result, the insulating film shrinks and covers the two main surfaces, the two side surfaces, and the bottom surface of exterior can 10. The insulating film can prevent a short circuit between adjacent batteries 8 or between battery 8 and the end plate or a restraining member.

The plurality of batteries 8 are stacked at predetermined intervals with the main surfaces of adjacent batteries 8 facing each other. Note that the term "stack" means that a plurality of members are arranged in any one direction. Thus, stacking batteries 8 also includes arranging the plurality of batteries 8 horizontally. In the present exemplary embodiment, batteries 8 are stacked horizontally. Accordingly, stacking direction X of batteries 8 is a direction of extending in the horizontal direction. Hereinafter, when appropriate, a direction that is horizontal and is perpendicular to stacking direction X is referred to as horizontal direction Y, and a direction that is perpendicular to stacking direction X and horizontal direction Y is referred to as vertical direction Z.

Each battery 8 is disposed such that output terminals 14 are directed in the same direction. In the present exemplary embodiment, each battery 8 is disposed such that output terminals 14 are directed upward in the vertical direction. Hence the upper surface of battery stack 2 constitutes terminal placement surface 2a on which output terminal 14 of each battery 8 is disposed. When adjacent batteries 8 are connected in series, batteries 8 are stacked such that positive electrode terminal 14a of one battery 8 and negative electrode terminal 14b of another battery 8 are adjacent to each other. When adjacent batteries 8 are connected in parallel, positive electrode terminal 14a of one battery 8 and positive electrode terminal 14a of another battery 8 are laminated so as to be adjacent to each other.

Battery stack 2 has a plurality of inter-cell separators (not illustrated). The inter-cell separator is also referred to as an insulating spacer and is made of a resin sheet having an insulating property, for example. Examples of the resin used for forming the inter-cell separator include thermoplastic resins such as polypropylene (PP), polybutylene terephthalate (PBT), polycarbonate (PC), and Noryl (registered trademark) resin (modified PPE). The inter-cell separator is disposed between two adjacent batteries 8 to electrically insulate two batteries 8 from each other.

Battery stack 2 is sandwiched by a pair of end plates (not illustrated). The pair of end plates are disposed at both ends of battery stack 2 in stacking direction X of batteries 8. The pair of end plates are adjacent to batteries 8 located at both ends in stacking direction X with external end separators (not illustrated) interposed between the end plates and batteries 8. The external end separator can be made of the same resin material as the inter-cell separator. Each end plate is a metal sheet made of metal such as iron, stainless steel, or aluminum. By the external end separator being interposed between the end plate and battery 8, both are insulated.

Battery stack 2 and the pair of end plates are restrained by a pair of restraining members (not illustrated). The pair of restraining members are also called bind bars and are long members elongated in stacking direction X of batteries 8. The pair of restraining members are disposed in horizontal direction Y. The pair of restraining members are made of metal, for example, iron or stainless steel.

The plurality of batteries 8 and the plurality of inter-cell separators are alternately arranged, and these are sandwiched between the pair of end plates in stacking direction X with the external end separators interposed therebetween. In this state, both end parts of each restraining member in stacking direction X and the pair of end plates are fixed by screwing or the like, whereby the plurality of batteries 8 are fastened and restrained in stacking direction X. Accordingly, respective batteries 8 are positioned in stacking direction X. The separators, the end plates, and the restraining members have known structures, and thus, a detailed description will be omitted.

Bus bar plate 4 is placed on terminal placement surface 2a of battery stack 2. Bus bar plate 4 is a plate-shaped member that covers terminal placement surface 2a. Bus bar plate 4 includes a plurality of plate units 16 disposed for the plurality of batteries 8, respectively. Bus bar plate 4 has a plate shape as a whole by the plurality of plate units 16 being coupled to each other.

Each plate unit 16 is made of a resin such as polypropylene (PP), polybutylene terephthalate (PBT), polycarbonate (PC), or Noryl (registered trademark) resin (modified PPE). Each plate unit 16 includes body 18, a pair of terminal openings 20, and coupling mechanism 22.

Body 18 overlaps corresponding battery 8 as viewed in a first direction in which bus bar plate 4 and battery stack 2 are disposed side by side (in vertical direction Z in the present exemplary embodiment). Body 18 has a shape roughly corresponding to the upper surface of battery 8. Specifically, body 18 is a member having the shape of a substantially rectangular plate elongated in horizontal direction Y.

The pair of terminal openings 20 are openings through which the pair of output terminals 14 of corresponding battery 8 are exposed. Each plate unit 16 has a pair of terminal openings 20 at positions overlapping, in vertical direction Z, the pair of output terminals 14 of corresponding battery 8, that is, battery 8 on which the plate unit itself is placed. The pair of terminal openings 20 are provided at both ends in the longitudinal direction of body 18 having a substantially rectangular shape. That is, terminal opening 20 is provided at both ends of each plate unit 16 in a direction orthogonal to stacking direction X of batteries 8 (in horizontal direction Y in the present exemplary embodiment).

Bus bar 6 is placed on each terminal opening 20. The plurality of bus bars 6 are supported by bus bar plate 4. Each bus bar 6 is a substantially belt-shaped metal member that electrically connects output terminals 14 of adjacent batteries 8. One end of bus bar 6 is electrically connected to output terminal 14 of one battery 8, and the other end is electrically connected to output terminal 14 of another battery 8. Bus bar 6 and output terminal 14 are bonded to each other by, for example, laser bonding or ultrasonic bonding. Note that bus bars 6 may connect output terminals 14 of the same polarity of a plurality of adjacent batteries 8 in parallel to form a battery block and may further connect the battery blocks in series.

Coupling mechanism 22 is a mechanism that couples adjacent plate units 16 to each other and is disposed between the pair of terminal openings 20 in a direction in which the pair of terminal openings 20 are disposed side by side (in horizontal direction Y in the present exemplary embodiment). That is, coupling mechanism 22 is located between terminal openings 20 arranged in the direction orthogonal to stacking direction X of batteries 8. Coupling mechanism 22 of the present exemplary embodiment is provided at approximately the center in the longitudinal direction of substantially rectangular body 18. Note that each plate unit 16 has an opening (not illustrated) through which the safety valve is exposed at a position overlapping the safety valve of battery 8 in vertical direction Z. Coupling mechanism 22 is provided at a position not interfering with the opening. Coupling mechanism 22 is integrally molded with body 18.

Figure 2:
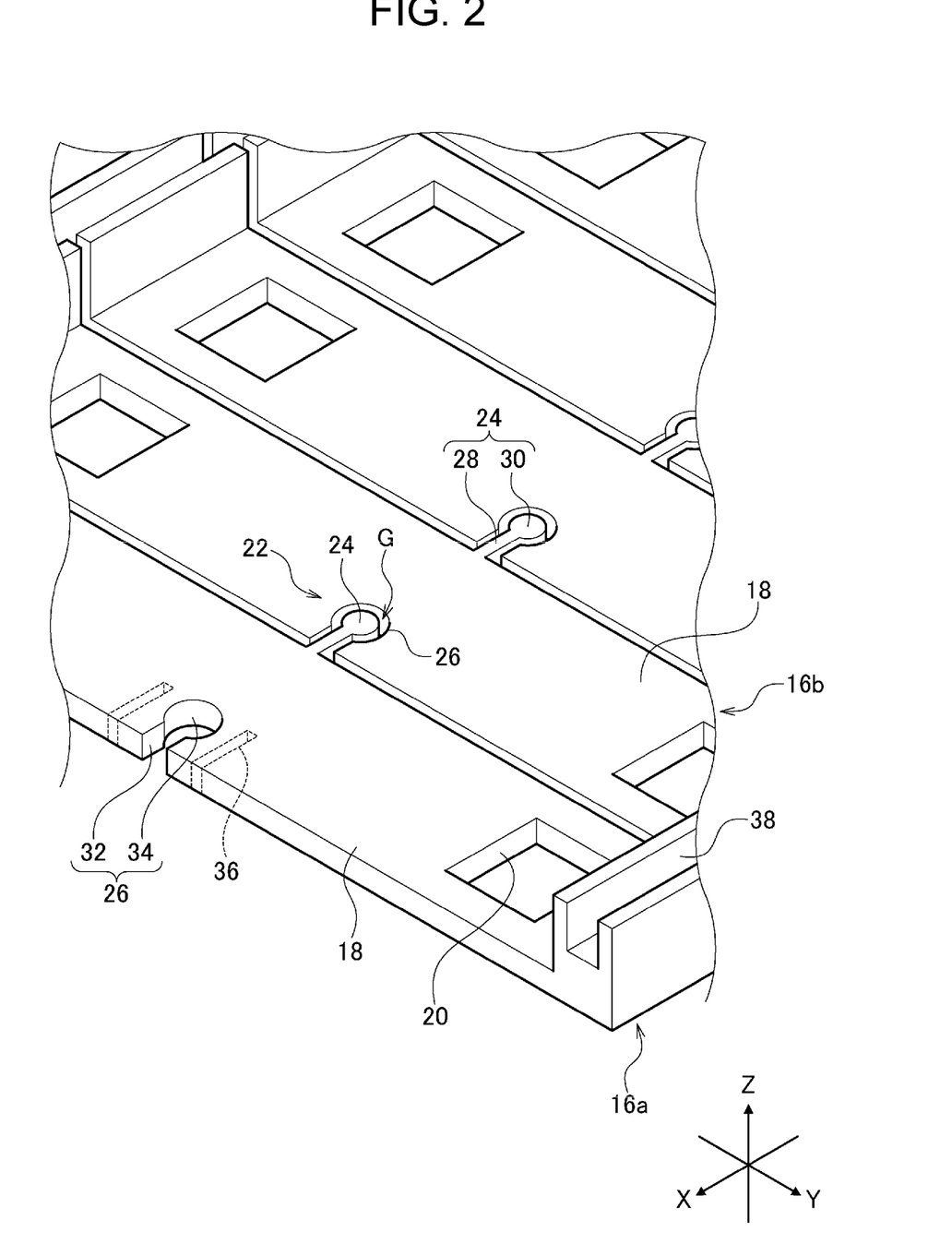
FIG. 2 is an enlarged perspective view illustrating a region including a coupling mechanism of the bus bar plate.

FIG. 2 is an enlarged perspective view illustrating a region including coupling mechanism 22 of bus bar plate 4. As illustrated in FIG. 2, coupling mechanism 22 is made up of male part 24 and female part 26. Male part 24 is disposed on first plate unit 16a out of first plate unit 16a and second plate unit 16b adjacent to each other, and female part 26 is disposed on second plate unit 16b. Each plate unit 16 has male part 24 on one long side surface of body 18 and female part 26 on the other long side surface. Thereby, each plate unit 16 can be coupled to plate units 16 on both sides.

Male part 24 is a convex engagement part protruding from body 18 of first plate unit 16a toward second plate unit 16b. Female part 26 is a concave engagement part provided on the surface of body 18 of second plate unit 16b closer to first plate unit 16a. Male part 24 protrudes in stacking direction X, and female part 26 is recessed in stacking direction X. Male part 24 of first plate unit 16a is fitted to female part 26 of second plate unit 16b, whereby first plate unit 16a and second plate unit 16b are coupled to each other.

Male part 24 of the present exemplary embodiment is made up of plate part 28 protruding toward second plate unit 16b, and column part 30 disposed at the tip of plate part 28. Plate part 28 is provided such that its thickness is directed in horizontal direction Y. Column part 30 is provided with its central axis directed in vertical direction Z and has a peripheral surface connected to the side surface of plate part 28 facing second plate unit 16b. The diameter of column part 30 is larger than the thickness (dimension in horizontal direction Y) of plate part 28. Female part 26 of the present exemplary embodiment is made up of plate-shaped space 32 corresponding to plate part 28 and columnar space 34 disposed at the tip of plate-shaped space 32 and corresponding to column part 30. The thickness (dimension in horizontal direction Y) of plate-shaped space 32 is smaller than the diameter of column part 30. Plate part 28, column part 30, plate-shaped space 32, and columnar space 34 each extend from the lower end to the upper end of body 18.

When first plate unit 16a and second plate unit 16b are pressed against each other with male part 24 and female part 26 aligned, column part 30 is press-fitted into plate-shaped space 32. Then, column part 30 passes through plate-shaped space 32 and enters columnar space 34. As a result, male part 24 is fitted to female part 26. Displacement in a direction in which first plate unit 16a and second plate unit 16b are separated from each other is reduced by interference between column part 30 accommodated in columnar space 34 and the sidewall that defines the width of plate-shaped space 32 which is narrower than that of column part 30.

Male part 24 and female part 26 are fitted to each other across gap G that allows a predetermined amount of displacement of first plate unit 16a and second plate unit 16b in stacking direction X of batteries 8. That is, in a state where male part 24 is fitted to female part 26, column part 30 and the peripheral surface of columnar space 34 are separated by gap G. Accordingly, the relative displacement between first plate unit 16a and second plate unit 16b, particularly displacement in stacking direction X, is allowed by gap G.

In the vicinity of female part 26 in horizontal direction Y, it is preferable to provide cutout 36 extending substantially parallel to plate-shaped space 32 with a predetermined interval from plate-shaped space 32 in horizontal direction Y. By providing cutout 36, the width of plate-shaped space 32 easily expands when male part 24 is fitted into female part 26, so that male part 24 can be easily fitted into female part 26. Note that cutouts 36 may be disposed on both sides of female part 26 or may be disposed only on one side.

As illustrated in FIG. 1, the plurality of plate units 16 have grooves 38 arranged in a line in a state of being coupled to each other outside terminal openings 20 in plate units 16. In the present exemplary embodiment, grooves 38 are provided at both ends in the longitudinal direction of body 18 having a substantially rectangular shape. Each groove 38 is located outside terminal opening 20 in plate units 16 in horizontal direction Y and extends in stacking direction X. Thus, guide grooves 40 formed of grooves 38 of plate units 16 and extending in stacking direction X are provided at both end parts of bus bar plate 4 in horizontal direction Y. With each plate unit 16 having grooves 38, a creepage distance between each output terminal 14 and the outside of battery module 1 can be increased.

By setting the positions of grooves 38 to both end parts of each plate unit 16 in horizontal direction Y, the creepage distance can be ensured more reliably. A voltage detection line and a duct structure for gas discharged from each battery 8 are provided in a central region of bus bar plate 4 in horizontal direction Y, whereby it is difficult to provide groove 38 having a height in vertical direction Z. In contrast, groove 38 can be easily provided in a region outside plate unit 16 from terminal opening 20.

Figure 3:
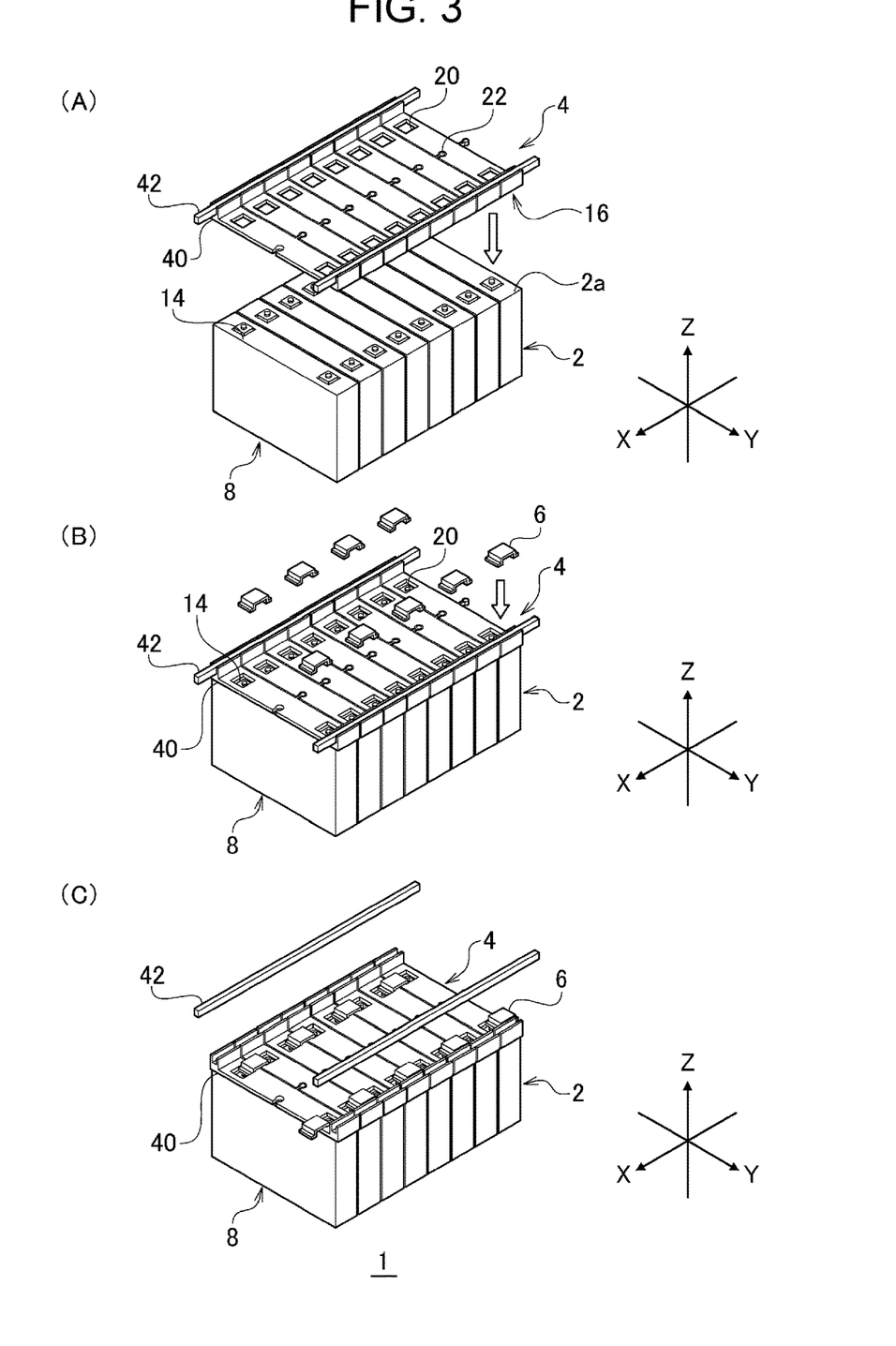
FIG. 3(A) to (C) is view illustrating an assembly process of the battery module.

Guide groove 40 is used in the assembly process of battery module 1. FIGS. 3(A) to 3(C) are views illustrating the assembly process of battery module 1. First, as illustrated in FIG. 3(A), the plurality of plate units 16 are coupled to each other by coupling mechanism 22 to assemble bus bar plate 4. Then, fixing rods 42 are fitted into the pair of guide grooves 40 of bus bar plate 4. Fixing rods 42 extend from one end to the other end of bus bar plate 4 in stacking direction X. Accordingly, fixing rods 42 are fitted into respective grooves 38 of the plurality of plate units 16.

Meanwhile, the plurality of batteries 8 and the inter-cell separators are alternately stacked to assemble battery stack 2. Battery stack 2 is sandwiched between the pair of end plates and is restrained by the pair of restraining members. Then, bus bar plate 4 with fixing rods 42 fitted into guide grooves 40 is placed on terminal placement surface 2a of battery stack 2.

As illustrated in FIG. 3(B), when bus bar plate 4 is placed on terminal placement surface 2a, output terminal 14 is exposed from terminal opening 20 of each plate unit 16. By fitting fixing rods 42 into guide grooves 40 of bus bar plate 4, plate units 16 can be prevented from being displaced from each other at the time of placing bus bar plate 4 on terminal placement surface 2a. This can make it easy to position terminal opening 20 of each plate unit 16 and output terminal 14 of each battery 8. Hence it is possible to easily place bus bar plate 4 on terminal placement surface 2a. After the placement of bus bar plate 4 on terminal placement surface 2a, bus bar 6 is placed on terminal opening 20 of each plate unit 16. A voltage detection line (not illustrated) is also placed on bus bar plate 4. Thus, bus bar plate 4 also functions as a support plate of the voltage detection line.

As illustrated in FIG. 3(C), each bus bar 6 is electrically connected to output terminal 14 exposed from terminal opening 20. In general, before bus bar 6 is connected to output terminal 14, a voltage detection line is connected to each bus bar 6 by laser bonding or the like. After each bus bar 6 is fixed to output terminal 14, fixing rod 42 is removed from guide groove 40. It is thereby possible to obtain battery module 1. After fixing rod 42 is removed from guide grooves 40, a cover plate (not illustrated) may be placed on the upper surface of bus bar plate 4. By placing the cover plate on bus bar plate 4, dew condensation water, dust, and the like is prevented from being in contact with output terminal 14, bus bar 6, the voltage detection line, and the like of battery 8.

As described above, bus bar plate 4 according to the present exemplary embodiment is a member for covering terminal placement surface 2a of battery stack 2 that includes the plurality of stacked batteries 8 and for supporting bus bars 6 that electrically connect output terminals 14. Bus bar plate 4 includes a plurality of plate units 16 disposed for the plurality of batteries 8, respectively. Each plate unit 16 includes a pair of terminal openings 20 through which a pair of output terminals 14 included in corresponding battery 8 are exposed, and coupling mechanism 22 that is disposed between the pair of terminal openings 20 and couples adjacent plate units 16 to each other.

Coupling mechanism 22 includes male part 24 disposed on first plate unit 16a out of first plate unit 16a and second plate unit 16b adjacent to each other, and female part 26 disposed on second plate unit 16b to which male part 24 is fitted. Male part 24 and female part 26 are fitted to each other across gap G that allows a predetermined amount of displacement of first plate unit 16a and second plate unit 16b in stacking direction X of batteries 8.

By making bus bar plate 4 have a structure in which the plurality of plate units 16 are coupled to each other, that is, by dividing bus bar plate 4 into a plurality of parts, it is possible to prevent the occurrence of warpage in the end part of bus bar plate 4 as compared to a case where the bus bar plate is formed of a single plate. Therefore, according to the present exemplary embodiment, it is possible to prevent the occurrence of warpage in the end part of bus bar plate 4 while increasing the size of bus bar plate 4 in accordance with the increase in the number of stacked batteries 8.

Male part 24 and female part 26 constituting coupling mechanism 22 of the present exemplary embodiment are fitted to each other across gap G that allows displacement of the plurality of plate units 16, coupled to each other, in stacking direction X. That is, the plurality of plate units 16 are coupled to each other with a predetermined positional degree of freedom. This enables the dimensions of bus bar plate 4 to follow the dimensional variation of battery stack 2 due to the expansion or contraction of battery 8. The size of gap G can be appropriately set on the basis of empirical knowledge of a designer or an experiment, simulation, or the like by the designer in accordance with the expansion amount, the number of stacking layers, or the like of battery 8.

Therefore, even when the dimensional variation of battery stack 2 increases as the number of stacked batteries 8 increases, it is possible to avoid an excessive load applied to bus bar plate 4. Further, with this structure, it is possible to absorb impact and vibration applied to bus bar plate 4 from the outside. Hence it is possible to reduce the possibility that bus bar plate 4 is damaged by a dimensional variation of battery stack 2, an impact applied from the outside, or the like. Due to no need for separately providing a displacement/impact absorbing structure to prevent the breakage of bus bar plate 4, it is possible to prevent the structure of bus bar plate 4 from being complicated and prevent the manufacturing process of bus bar plate 4 from being complicated in association with the complication of the structure.

Further, in the single-plate bus bar plate, when the bus bar plate is increased in size, dimensional accuracy is likely to decrease. When the dimensions of the bus bar plate do not match the dimensions of battery stack 2, it is difficult to attach the bus bar plate to battery stack 2. In contrast, by forming a coupling structure that allows the relative displacement of the plurality of plate units 16, the dimensions of entire bus bar plate 4 can be freely adjusted within a predetermined range. Further, with bus bar plate 4 having been divided into the plurality of plate units 16, the dimensions of each plate unit 16 is naturally smaller than the dimensions of entire bus bar plate 4. Hence the dimensional accuracy of each plate unit 16 can be enhanced. Accordingly, even when bus bar plate 4 is increased in size, it is possible to avoid difficulty in attachment to battery stack 2.

Moreover, with bus bar plate 4 having a structure in which the plurality of plate units 16 are coupled to each other, the size of bus bar plate 4 can be easily changed by adjusting a number of plate units 16. It is thus possible to flexibly cope with a change in the number of stacked batteries 8. As described above, according to the present exemplary embodiment, it is possible to provide bus bar plate 4 capable of coping with an increase in the number of stacked batteries 8.

Respective plate units 16 of the present exemplary embodiment have grooves 38 arranged in a line in a state of being coupled to each other outside plate unit 16 from terminal openings 20. This enables an increase in the creepage distance between each output terminal 14 and the outside of battery module 1. Grooves 38 arranged in a row constitutes guide groove 40, and fixing rod 42 is fitted into guide groove 40 in the process of assembling battery module 1. Accordingly, at the time of placing bus bar plate 4 on battery stack 2, the relative displacement of plate units 16 can be regulated. It is thus possible to simplify the assembly process of battery module 1.

Second Exemplary Embodiment

Figure 4:
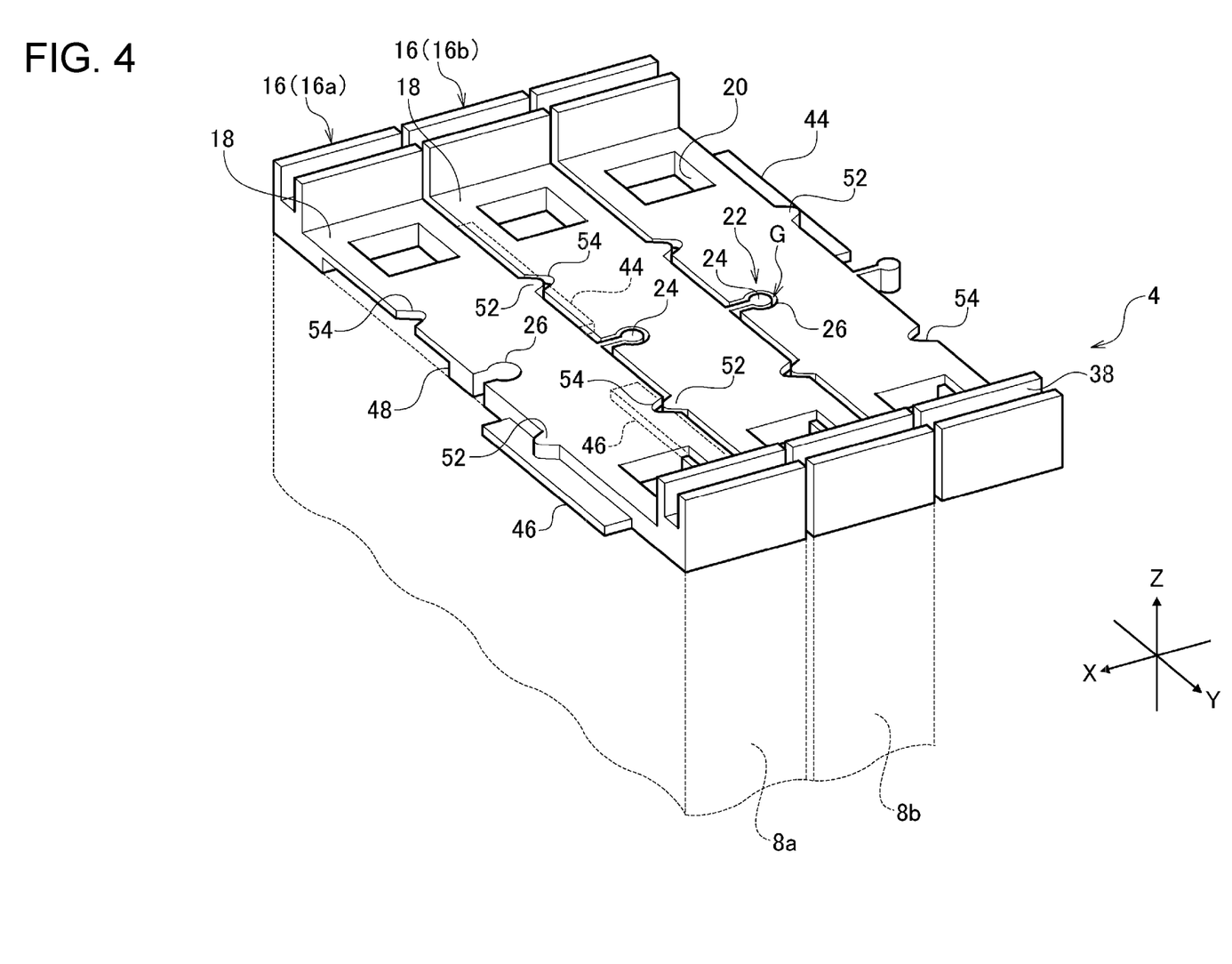
FIG. 4 is a perspective view of a part of a bus bar plate according to a second exemplary embodiment as viewed obliquely from above.
Figure 5:
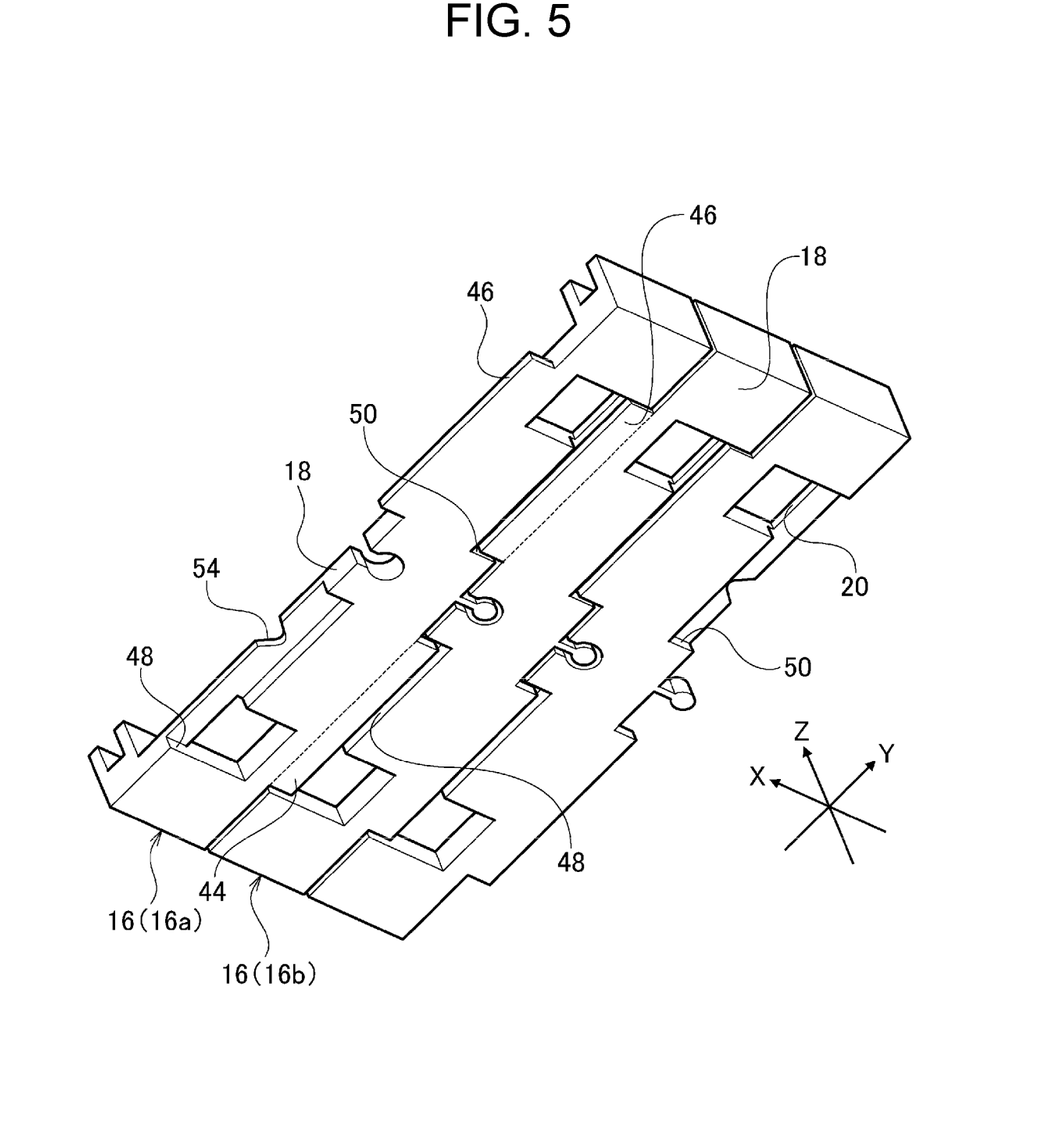
FIG. 5 is a perspective view of a part of the bus bar plate according to the second exemplary embodiment as viewed obliquely from below.

A second exemplary embodiment has a configuration common to the first exemplary embodiment except for the shape of plate unit 16. Hereinafter, the present exemplary embodiment will be described focusing on a configuration different from that of the first exemplary embodiment, and common configurations will be briefly described or not described. FIG. 4 is a perspective view of a part of bus bar plate 4 according to the second exemplary embodiment as viewed obliquely from above. FIG. 5 is a perspective view of a part of bus bar plate 4 according to the second exemplary embodiment as viewed obliquely from below.

Bus bar plate 4 includes a plurality of plate units 16. In arbitrary first plate unit 16a and second plate unit 16b adjacent to each other, first plate unit 16a includes body 18 and first protrusion 44. Body 18 is a member in the shape of a substantially rectangular plate that overlaps corresponding first battery 8a as viewed from a first direction in which bus bar plate 4 and battery stack 2 are disposed side by side (in vertical direction Z in the present exemplary embodiment). First protrusion 44 protrudes from body 18 toward second plate unit 16b and overlaps second plate unit 16b as viewed in the first direction. First protrusion 44 has a plate shape elongated in horizontal direction Y and is disposed such that its main surface is directed in vertical direction Z. First protrusion 44 is integrally molded with body 18.

By providing first protrusion 44 on first plate unit 16a, it is possible to prevent terminal placement surface 2a from being exposed from the gap between first plate unit 16a and second plate unit 16b when first plate unit 16a and second plate unit 16b are relatively displaced. It is thereby possible to more reliably ensure the creepage distance between output terminal 14 and the outside of battery module 1.

On the other hand, second plate unit 16b includes body 18 and second protrusion 46. Body 18 is a member in the shape of a substantially rectangular plate that overlaps corresponding second battery 8b as viewed in the first direction. Second protrusion 46 protrudes from body 18 toward first plate unit 16a and overlaps first plate unit 16a as viewed in the first direction. Second protrusion 46 has a plate shape elongated in horizontal direction Y and is disposed such that its main surface is directed in vertical direction Z. Second protrusion 46 is integrally molded with body 18.

By providing second protrusion 46 on second plate unit 16b, it is possible to further prevent the exposure of terminal placement surface 2a can be further reduced. It is thereby possible to more reliably ensure the creepage distance between output terminal 14 and the outside of battery module 1.

First protrusion 44 and second protrusion 46 of the present exemplary embodiment are disposed with coupling mechanism 22 interposed therebetween in horizontal direction Y. First protrusion 44 is aligned such that its lower main surface is flush with the lower main surface of body 18. First protrusion 44 is inserted between body 18 of second plate unit 16b and second battery 8b. Second protrusion 46 is aligned such that its lower main surface is flush with the lower main surface of body 18. Second protrusion 46 is inserted between body 18 of first plate unit 16a and first battery 8a.

Therefore, first plate unit 16a and second plate unit 16b adjacent to each other overlap each other with first plate unit 16a located above and second plate unit 16b located below in a region on one end in horizontal direction Y and with first plate unit 16a located above and second plate unit 16b located below in a region on the other end in horizontal direction Y. It is thereby possible to prevent one of first plate unit 16a and second plate unit 16b from coming off in vertical direction Z with respect to the other.

Body 18 of second plate unit 16b has first concave part 48, which is recessed away from second battery 8b, on the lower surface facing terminal placement surface 2a. First concave part 48 is disposed to overlap first protrusion 44 when viewed in stacking direction X. First concave part 48 is connected to the surface of body 18 facing first plate unit 16a. When male part 24 of first plate unit 16a is fitted into female part 26 of second plate unit 16b, first protrusion 44 is inserted into first concave part 48. In this state, the lower surface of first protrusion 44 is exposed toward battery stack 2 to constitute a part of the lower surface of bus bar plate 4.

Body 18 of first plate unit 16a has second concave part 50, which is recessed away from first battery 8a, on the lower surface facing terminal placement surface 2a. Second concave part 50 is disposed to overlap second protrusion 46 when viewed in stacking direction X. Second concave part 50 is connected to the surface of body 18 facing second plate unit 16b. When male part 24 of first plate unit 16a is fitted into female part 26 of second plate unit 16b, second protrusion 46 is inserted into second concave part 50. In this state, the lower surface of second protrusion 46 is exposed toward battery stack 2 to constitute a part of the lower surface of bus bar plate 4.

By accommodating first protrusion 44 in first concave part 48 and accommodating second protrusion 46 in second concave part 50, the lower surface of bus bar plate 4 facing battery stack 2 can be made flat. Accordingly, it is possible to prevent the generation of a gap between bus bar plate 4 and terminal placement surface 2a. Hence it is possible to more reliably ensure the creepage distance between each output terminal 14 and the outside of battery module 1.

Body 18 of first plate unit 16a has positioning projection 52 protruding toward second plate unit 16b. Positioning projection 52 has a triangular shape when viewed in vertical direction Z and protrudes such that its width in horizontal direction Y gradually decreases as positioning projection 52 is separated from body 18. On the other hand, body 18 of second plate unit 16b has positioning cutout 54 on the surface facing first plate unit 16a. Positioning cutout 54 has a triangular shape as viewed in vertical direction Z and is recessed such that its width in horizontal direction Y gradually decreases as positioning cutout 54 is separated from first plate unit 16a. Positioning projection 52 and positioning cutout 54 are disposed to overlap each other as viewed in stacking direction X. In the present exemplary embodiment, positioning projection 52 of first plate unit 16a is disposed on the upper surface of first protrusion 44.

When first plate unit 16a and second plate unit 16b are coupled, positioning projection 52 is fitted into positioning cutout 54. Thus, first plate unit 16a and second plate unit 16b can be positioned relative to each other particularly in horizontal direction Y.

Body 18 of second plate unit 16b has positioning projection 52 protruding toward first plate unit 16a. On the other hand, body 18 of first plate unit 16a has positioning cutout 54 on the surface facing second plate unit 16b. Positioning projection 52 and positioning cutout 54 are disposed to overlap each other as viewed in stacking direction X. In the present exemplary embodiment, positioning projection 52 of second plate unit 16b is disposed on the upper surface of second protrusion 46. In each plate unit 16, positioning projection 52 and positioning cutout 54 are disposed with coupling mechanism 22 interposed therebetween in horizontal direction Y. Thereby, first plate unit 16a and second plate unit 16b can be positioned more reliably.

Each plate unit 16 has male part 24, first protrusion 44, second concave part 50, positioning projection 52, and positioning cutout 54 on one long side surface of body 18 and has female part 26, first concave part 48, second protrusion 46, positioning cutout 54, and positioning projection 52 on the other long side surface. Thereby, each plate unit 16 can be coupled to plate units 16 on both sides.

Third Exemplary Embodiment

Figure 6:
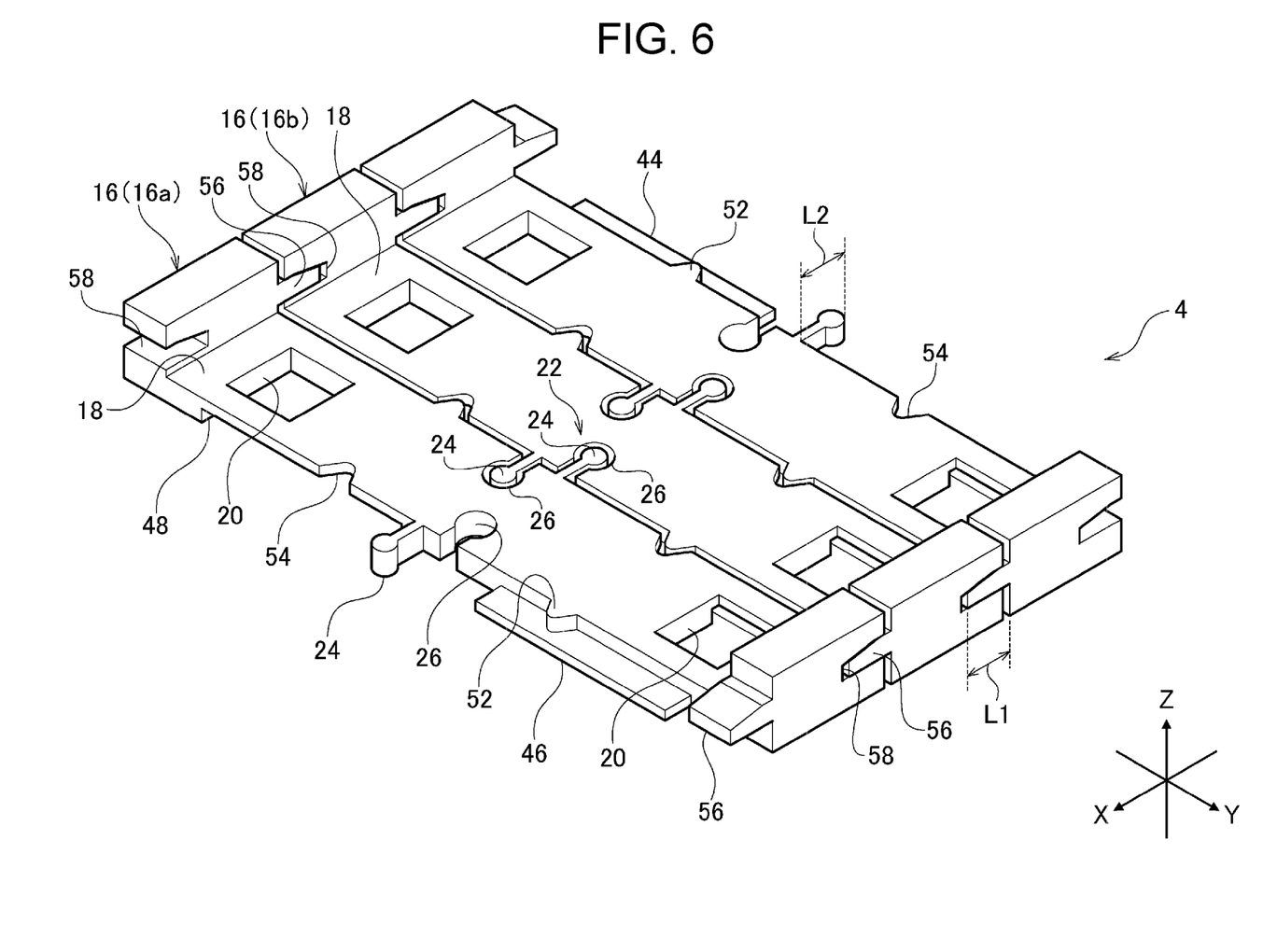
FIG. 6 is a perspective view of a part of a bus bar plate according to a third exemplary embodiment as viewed obliquely from above.

A third exemplary embodiment has a configuration common to the first or second exemplary embodiment except for the shape of plate unit 16. Hereinafter, the present exemplary embodiment will be described focusing on a configuration different from those of the first and second exemplary embodiments, and common configurations will be briefly described or not described. FIG. 6 is a perspective view of a part of bus bar plate 4 according to the third exemplary embodiment as viewed obliquely from above.

Bus bar plate 4 includes a plurality of plate units 16. In any of first plate unit 16a and second plate unit 16b adjacent to each other, first plate unit 16a has one of position-regulating convex part 56 and position-regulating concave part 58, which are fitted to each other, outside plate unit 16a from terminal opening 20 in the direction orthogonal to stacking direction X of batteries 8 (in horizontal direction Y in the present exemplary embodiment). First plate unit 16a has the one outside plate unit 16a from at least one terminal opening 20. Second plate unit 16b has the other of position-regulating convex part 56 and position-regulating concave part 58 outside terminal opening 20 in plate unit 16b in the direction orthogonal to stacking direction X of batteries 8. Second plate unit 16b has the other outside plate unit 16b from at least one terminal opening 20. Position-regulating convex part 56 has a substantially plate shape, is provided with its main surface directed in vertical direction Z, and protrudes toward adjacent plate unit 16. Position-regulating concave part 58 has a recessed shape corresponding to the shape of position-regulating convex part 56.

First plate unit 16a according to the present exemplary embodiment has position-regulating convex part 56 on the outer side of one terminal opening 20 in plate unit 16a in horizontal direction Y and has position-regulating concave part 58 on the outer side of another terminal opening 20 in plate unit 16a in horizontal direction Y. Second plate unit 16b has position-regulating concave part 58 at a position overlapping position-regulating convex part 56 of first plate unit 16a in stacking direction X and has position-regulating convex part 56 at a position overlapping position-regulating concave part 58 of first plate unit 16a in stacking direction X.

At the time of coupling first plate unit 16a and second plate unit 16b to each other, position-regulating convex part 56 enters position-regulating concave part 58 and is fitted thereto. By disposing position-regulating convex part 56 and position-regulating concave part 58 outside terminal openings 20 in first plate unit 16a and second plate unit 16b, it is possible to effectively prevent the relative rotation of first plate unit 16a and second plate unit 16b with coupling mechanism 22 as a rotation shaft. Further, by setting the positions where position-regulating convex part 56 and position-regulating concave part 58 are provided to the end parts of each plate unit 16 in horizontal direction Y, it is possible to easily ensure the installation space of each of position-regulating convex part 56 and position-regulating concave part 58.

In one end part of body 18 in horizontal direction Y, each plate unit 16 has position-regulating convex part 56 on one long side surface and has position-regulating concave part 58 on the other long side surface. In the other end part of body 18 in horizontal direction Y, each plate unit 16 has position-regulating concave part 58 on one long side surface and has position-regulating convex part 56 on the other long side surface. Accordingly, position-regulating convex parts 56 of each plate unit 16 can be fitted to position-regulating concave parts 58 of plate units 16 on both sides, and position-regulating concave parts 58 of each plate unit 16 can be fitted to position-regulating convex parts 56 of plate units 16 on both sides.

In the present exemplary embodiment, protruding length L1 of position-regulating convex part 56 is larger than protruding length L2 of male part 24. That is, the dimension of position-regulating convex part 56 in stacking direction X is larger than the dimension of male part 24 in stacking direction X, and the tip of position-regulating convex part 56 protrudes toward adjacent plate unit 16 more than the tip of male part 24. Thus, at the time of coupling first plate unit 16a and second plate unit 16b to each other, position-regulating convex part 56 starts to enter position-regulating concave part 58 before male part 24 starts to enter female part 26.

Therefore, position-regulating convex parts 56 and position-regulating concave part 58 serve as guides for determining the orientations of respective plate units 16 at the time of coupling first plate unit 16a and second plate unit 16b to each other. This can simplify the assembling process of bus bar plate 4. It is also possible to provide both position-regulating convex part and concave parts 56 and 58 and groove 38 in each plate unit 16.

Coupling mechanism 22 of the present exemplary embodiment has two sets of male part 24 and female part 26. Specifically, first plate unit 16a has male part 24 and female part 26 on the surface facing second plate unit 16b. On the other hand, second plate unit 16b has female part 26 and male part 24 on the surface facing first plate unit 16a. Male part 24 of first plate unit 16a and female part 26 of second plate unit 16b are disposed to overlap each other as viewed in stacking direction X. Similarly, female part 26 of first plate unit 16a and male part 24 of second plate unit 16b are disposed to overlap each other as viewed in stacking direction X.

Male part 24 and female part 26 provided on first plate unit 16a are disposed close to each other in horizontal direction Y. Similarly, male part 24 and female part 26 provided on second plate unit 16b are disposed close to each other in horizontal direction Y.

When first plate unit 16a and second plate unit 16b are pressed against each other, male part 24 of first plate unit 16a and female part 26 of second plate unit 16b are fitted to each other. Female part 26 of first plate unit 16a and male part 24 of second plate unit 16b are fitted to each other. Thus, the plurality of plate units 16 can be coupled more firmly. Each plate unit 16 has male part 24 and female part 26 on both long side surfaces of body 18. Thereby, each plate unit 16 can be coupled to plate units 16 on both sides.

Plate unit 16 according to the present exemplary embodiment has a two-fold rotationally symmetrical shape as viewed in a first direction in which bus bar plate 4 and battery stack 2 are disposed side by side (in vertical direction Z in the present exemplary embodiment). That is, each of plate units 16 has a rotationally symmetric shape about an axis that passes through an intermediate point of stacking direction X of batteries 8 and a direction orthogonal to stacking direction X and extends in the first direction. Therefore, first plate unit 16a and second plate unit 16b have the same shape, and when first plate unit 16a is rotated, second plate unit 16b is obtained. This makes it possible to prevent an increase in the number of components of bus bar plate 4 and, consequently, battery module 1, and to simplify the assembly work.

This rotationally symmetric shape can be achieved by providing male part 24, female part 26, positioning projection 52, positioning cutout 54, position-regulating convex part 56, and position-regulating concave part 58 on both surfaces of each plate unit 16 in stacking direction X of batteries 8, providing each structure provided on one surface and each structure provided on the other surface at rotationally symmetric positions, providing first protrusion 44 provided on one surface and second protrusion 46 provided on the other surface at rotationally symmetric positions, and providing second concave part 50 provided on one surface and first concave part 48 provided on the other surface at rotationally symmetric positions.

The exemplary embodiments of the present invention have been described in detail above. The above-described exemplary embodiments are merely specific examples for implementing the present invention. The contents of the exemplary embodiments do not limit the technical scope of the present invention, and many design changes such as changes, additions, and deletions of configuration elements can be made without departing from the spirit of the invention defined in the claims. Any new exemplary embodiment to which design change has been made has an effect of each of the combined exemplary embodiments and modified examples. In the above-described exemplary embodiments, with respect to the contents where such design changes can be made, the contents are emphasized with expressions such as "of the present exemplary embodiment" and "in the present exemplary embodiment". However, design changes are allowed even with respect to the contents without such expressions. Any combination of configuration elements included in the exemplary embodiments is also effective as an aspect of the present invention. Hatching applied to the cross section in the drawing does not limit the material of the object to which the hatching has been applied.

First Modified Example

Figure 7:
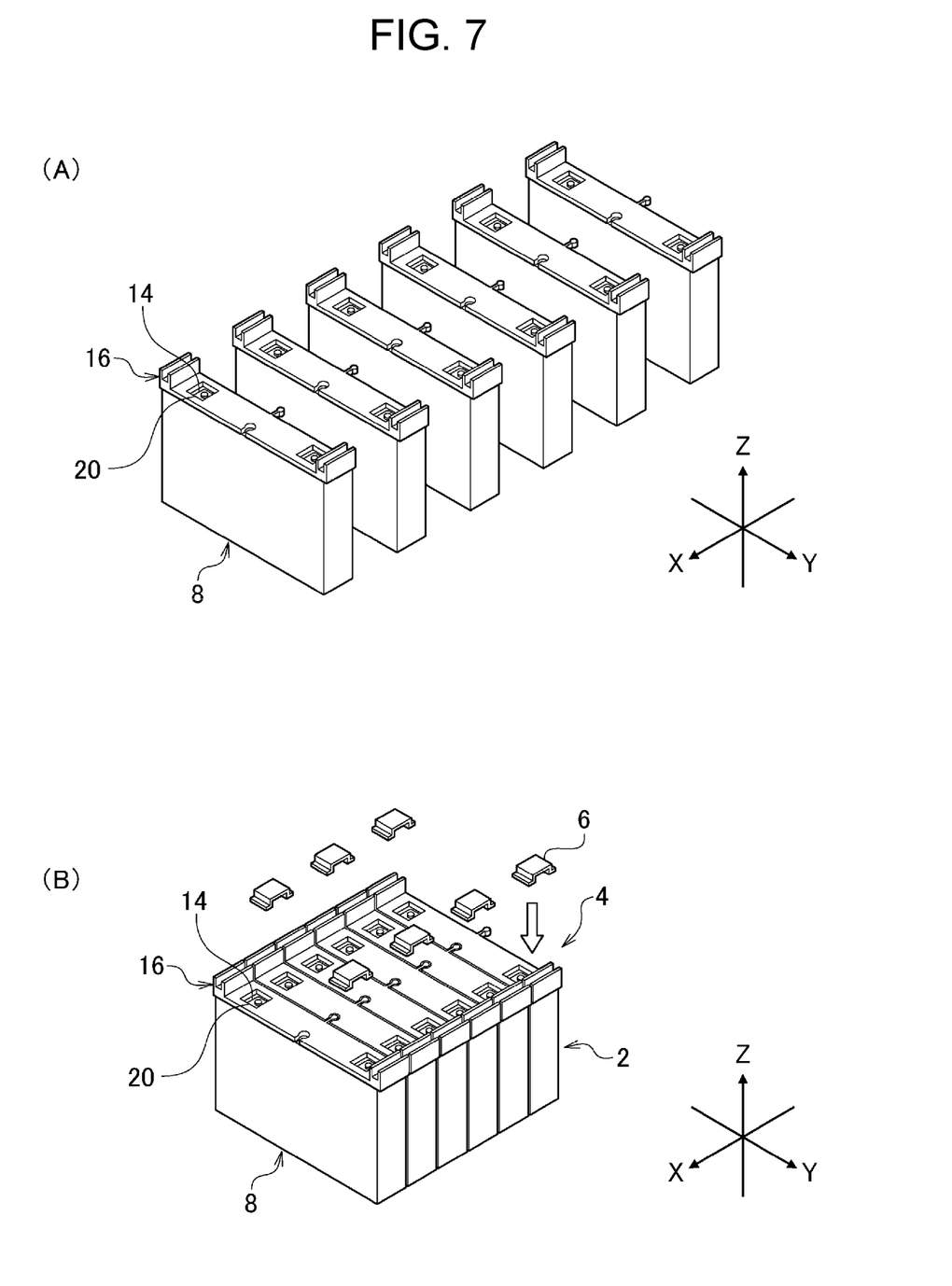

In the assembly process of battery module 1 described in the first exemplary embodiment, bus bar plate 4 and battery stack 2 are separately assembled, and then bus bar plate 4 is placed on battery stack 2. However, the present disclosure is not particularly limited to this procedure. FIGS. 7(A) and 7(B) are views illustrating an assembly process of battery module 1 according to a first modified example. In the present modified example, as illustrated in FIG. 7(A), each plate unit 16 is fixed to the upper surface of each battery 8.

As illustrated in FIG. 7(B), a plurality of batteries 8 to which plate unit 16 is fixed and the inter-cell separators are alternately stacked to assemble battery stack 2. At this time, batteries 8 are pressed in stacking direction X, and adjacent plate units 16 are coupled to each other by coupling mechanism 22. Thus, bus bar plate 4 is assembled simultaneously with battery stack 2. Thereafter, bus bar 6 is placed on terminal opening 20 of each plate unit 16 and is electrically connected to output terminal 14 exposed from terminal opening 20. A voltage detection line is also placed on bus bar plate 4 and electrically connected to bus bar 6. It is thereby possible to obtain battery module 1.

Second Modified Example

Figure 8:
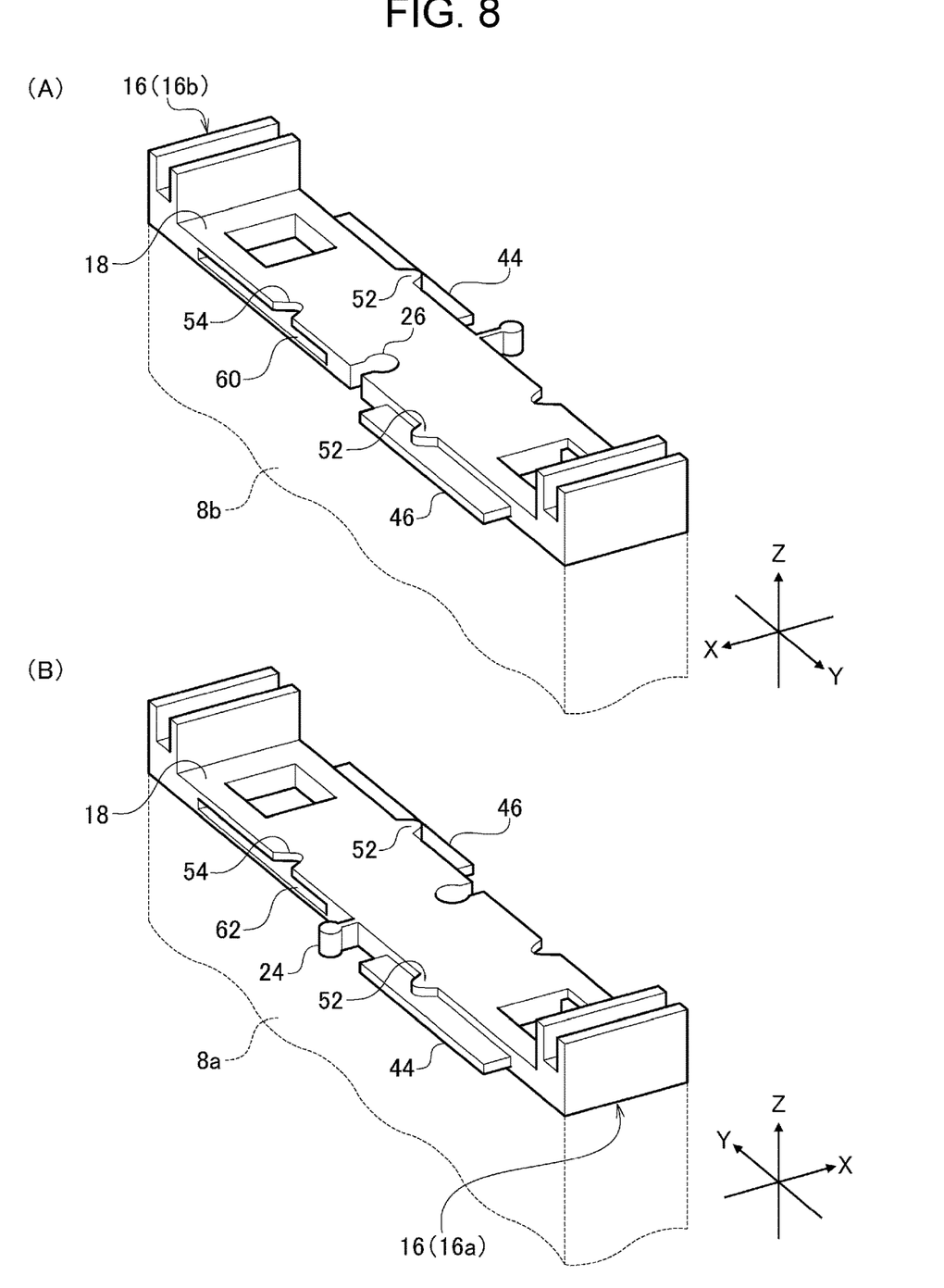
FIG. 8(A) is a perspective view of a second plate unit according to a second modified example as viewed from a first plate unit.
FIG. 8(B) is a perspective view of the first plate unit according to the second modified example as viewed from a second plate unit.

In the second exemplary embodiment, first protrusion 44 fits in first concave part 48 provided on the lower surface of second plate unit 16b, and second protrusion 46 fits in second concave part 50 provided on the lower surface of first plate unit 16a. However, the present disclosure is not particularly limited to this configuration. FIG. 8(A) is a perspective view of second plate unit 16b according to a second modified example as viewed from first plate unit 16a. FIG. 8(B) is a perspective view of first plate unit 16a according to the second modified example as viewed from second plate unit 16b.

Second plate unit 16b according to the present modified example includes body 18 and first hole 60 provided in the surface of body 18 facing first plate unit 16a. First hole 60 has an opening shape corresponding to first protrusion 44 as viewed in stacking direction X. When first plate unit 16a and second plate unit 16b are coupled to each other, first protrusion 44 of first plate unit 16a is inserted into first hole 60. In this state, the upper surface and the lower surface of first protrusion 44 are in contact with the top surface (inner upper surface) and the bottom surface (inner lower surface) of first hole 60. Thus, by adopting a structure in which first protrusion 44 is inserted into first hole 60, the creepage distance between output terminal 14 of each battery 8 and the outside of battery module 1 can be further increased.

Similarly, first plate unit 16a according to the present modified example includes body 18 and second hole 62 provided in the surface of body 18 facing second plate unit 16b. Second hole 62 has an opening shape corresponding to second protrusion 46 as viewed in stacking direction X. When first plate unit 16a and second plate unit 16b are coupled to each other, second protrusion 46 of second plate unit 16b is inserted into second hole 62. In this state, the upper surface and the lower surface of second protrusion 46 are in contact with the top surface and the bottom surface of second hole 62. Thus, by adopting a structure in which second protrusion 46 is inserted into second hole 62, the creepage distance between output terminal 14 of each battery 8 and the outside of battery module 1 can be further increased.

(Others)

The number of batteries 8 provided in battery module 1 is not particularly limited. The structure of each part of battery module 1 including the fastening structure of the end plate and the restraining member is not particularly limited. Batteries 8 may have a cylindrical shape or the like.

In the exemplary embodiments and the modified examples described above, each plate unit 16 and each battery 8 are associated on a one-to-one basis, but the present disclosure is not particularly limited to this configuration. For example, an assembly of several batteries 8 may be associated with one plate unit 16. That is, respective plate unit 16 may be disposed for the plurality of batteries 8 on a one-to-one basis, or the plurality of batteries 8 may be divided into a plurality of assemblies each made up of some batteries 8, and respective plate units 16 may be disposed for the respective assemblies. One plate unit 16 may be provided for one battery 8, and another plate unit 16 may be provided for the assembly.

By disposing plate unit 16 for the assembly of batteries 8, the number of plate units 16 constituting bus bar plate 4 can be reduced. For example, when first plate unit 16a of the first exemplary embodiment is provided for two batteries 8, body 18 of first plate unit 16a has twice the dimension in stacking direction X. Further, two terminal openings 20 are disposed side by side in stacking direction X at each end part of body 18 in horizontal direction Y.

When first plate unit 16a is disposed for the first assembly of batteries 8 and second plate unit 16b is disposed for the second assembly of batteries 8, body 18 of first plate unit 16a overlaps the first assembly, and body 18 of second plate unit 16b overlaps the second assembly. First protrusion 44 of first plate unit 16a is inserted between second plate unit 16b and the second assembly, and second protrusion 46 of second plate unit 16b is inserted between first plate unit 16a and the first assembly.

The exemplary embodiment may be specified by an item described below.

[Item 1]

Battery module 1 including:
 battery stack 2 in which a plurality of batteries 8 are stacked;
 bus bar 6 that electrically connects output terminals 14 of the plurality of batteries 8 to each other; and
 bus bar plate 4 that supports bus bars 6.

REFERENCE MARKS IN THE DRAWINGS

2: battery stack
4: bus bar plate
6: bus bar
8: battery
14: output terminal
16: plate unit
18: body
20: terminal opening
22: coupling mechanism
24: male part
26: female part
38: groove
44: first protrusion
46: second protrusion
56: position-regulating convex part
58: position-regulating concave part
60, 62: hole

The invention claimed is:

1. A bus bar plate that covers a surface of a battery stack including a plurality of stacked batteries, the surface being provided with output terminals of each of the plurality of stacked batteries, and supports a bus bar electrically connecting the output terminals,
 the bus bar plate comprising a plurality of plate units including a first plate unit and a second plate unit adjacent to each other,
 wherein each of the plurality of plate units is disposed corresponding to at least one corresponding battery in the plurality of stacked batteries,
 each of the plurality of plate units includes
  terminal openings for exposure of the output terminals provided on the at least one corresponding battery, and
  a coupling mechanism that couples each of the plurality of plate units to at least one adjacent plate unit in the plurality of plate units to each other,
 the terminal openings are provided at both ends of each of the plurality of plate units in an orthogonal direction orthogonal to a stacking direction of the plurality of stacked batteries,
 the coupling mechanism is located between, and inward from, the terminal openings in the orthogonal direction,
 the coupling mechanism includes a male part provided in the first plate unit, and a female part provided in the second plate unit,
 the male part being fitted with the female part with a gap therebetween upon fitting of the male part and the female part, and
 the first plate unit and the second plate unit are configured to be displaceable relative to each other by an amount defined by the gap in the stacking direction, so as to follow a dimensional variation of the battery stack due to an expansion of contraction of the plurality of stacked batteries.

2. The bus bar plate according to claim 1, wherein the first plate unit includes a body that overlaps a corresponding first battery or first assembly as viewed in a first direction of the bus bar plate and the battery stack being disposed side by side, and a first protrusion that protrudes from the body toward the second plate unit and overlaps the second plate unit as viewed in the first direction.

3. The bus bar plate according to claim 2, wherein the second plate unit includes a body that overlaps a corresponding second battery or second assembly as viewed in the first direction, and a second protrusion that protrudes from the body toward the first plate unit and overlaps the first plate unit as viewed in the first direction.

4. The bus bar plate according to claim 3, wherein the first protrusion and the second protrusion are disposed across the coupling mechanism, the first protrusion is inserted between the second plate unit and the second battery or the second assembly, and the second protrusion is inserted between the first plate unit and the first battery or the first assembly.

5. The bus bar plate according to claim 3, wherein the first plate unit includes a body that overlaps a corresponding first battery or first assembly as viewed in the first direction, and a second hole provided in a surface of the body facing the second plate unit, and the second protrusion is inserted in the second hole.

6. The bus bar plate according to claim 2, wherein the second plate unit includes a body that overlaps a corresponding second battery or second assembly as viewed in the first direction, and a first hole provided in a surface of the body facing the first plate unit, and the first protrusion is inserted in the first hole.

7. The bus bar plate according to claim 1, wherein each of the plurality of plate units includes a two-fold rotationally symmetrical shape as viewed in the first direction of the bus bar plate and the battery stack being disposed side by side.

8. A bus bar plate that covers a surface of a battery stack including a plurality of stacked batteries, the surface being provided with output terminals of each of the plurality of stacked batteries, and supports a bus bar electrically connecting the output terminals, the bus bar plate comprising a plurality of plate units, wherein each of the plurality of plate units is disposed corresponding to at least one corresponding battery in the plurality of stacked batteries, each of the plurality of plate units includes terminal openings for exposure of the output terminals provided on the at least one corresponding battery, and a coupling mechanism that couples each of the plurality of plate units to at least one adjacent plate unit in the plurality of plate units to each other, the terminal openings are provided at both ends of each of the plurality of plate units in an orthogonal direction orthogonal to a stacking direction of the plurality of stacked batteries, the coupling mechanism is located between the terminal openings arranged in the orthogonal direction, the coupling mechanism includes a male part and a female part, the male part being fitted with a gap to a female part of a second plate unit out of the first plate unit and a second plate unit adjacent to each other, and the female part being fitted with the gap to the male part of the first plate unit out of the first plate unit and the second plate unit, and the gap allows a predetermined amount of displacement of the first plate unit and the second plate unit in the stacking direction, wherein the first plate unit includes one of a position-regulating convex part and a position-regulating concave part, fitted to each other, outside the terminal opening in the first plate unit in the orthogonal direction, and the second plate unit includes another of the position-regulating convex part and the position-regulating concave part outside the terminal opening in the second plate unit in the orthogonal direction.

9. The bus bar plate according to claim 8, wherein a protruding length of the position-regulating convex part is larger than a protruding length of the male part.

10. A bus bar plate that covers a surface of a battery stack including a plurality of stacked batteries, the surface being provided with output terminals of each of the plurality of stacked batteries, and supports a bus bar electrically connecting the output terminals, the bus bar plate comprising a plurality of plate units, wherein each of the plurality of plate units is disposed corresponding to at least one corresponding battery in the plurality of stacked batteries, each of the plurality of plate units includes terminal openings for exposure of the output terminals provided on the at least one corresponding battery, and a coupling mechanism that couples each of the plurality of plate units to at least one adjacent plate unit in the plurality of plate units to each other, the terminal openings are provided at both ends of each of the plurality of plate units in an orthogonal direction orthogonal to a stacking direction of the plurality of stacked batteries, the coupling mechanism is located between the terminal openings arranged in the orthogonal direction, the coupling mechanism includes a male part and a female part, the male part being fitted with a gap to a female part of a second plate unit out of the first plate unit and a second plate unit adjacent to each other, and the female part being fitted with the gap to the male part of the first plate unit out of the first plate unit and the second plate unit, and the gap allows a predetermined amount of displacement of the first plate unit and the second plate unit in the stacking direction, wherein the plurality of plate units include grooves, arranged in a line in a state of being coupled to each other, outside the terminal opening in the plate units.

11. The bus bar plate according to claim 10, wherein the first plate unit includes a body that overlaps a corresponding first battery or first assembly as viewed in a first direction of the bus bar plate and the battery stack being disposed side by side, and a first protrusion that protrudes from the body toward the second plate unit and overlaps the second plate unit as viewed in the first direction.

12. The bus bar plate according to claim 11, wherein the second plate unit includes a body that overlaps a corresponding second battery or second assembly as viewed in the first direction, and a second protrusion that protrudes from the body toward the first plate unit and overlaps the first plate unit as viewed in the first direction.

13. The bus bar plate according to claim 12, wherein the first protrusion and the second protrusion are disposed across the coupling mechanism, the first protrusion is inserted between the second plate unit and the second battery or the second assembly, and the second protrusion is inserted between the first plate unit and the first battery or the first assembly.

14. The bus bar plate according to claim 12, wherein the first plate unit includes a body that overlaps a corresponding first battery or first assembly as viewed in the first direction, and a second hole provided in a surface of the body facing the second plate unit, and the second protrusion is inserted in the second hole.

15. The bus bar plate according to claim 11, wherein the second plate unit includes a body that overlaps a corresponding second battery or second assembly as viewed in the first direction, and a first hole provided in a surface of the body facing the first plate unit, and the first protrusion is inserted in the first hole.

16. The bus bar plate according to claim 10, wherein each of the plurality of plate units includes a two-fold rotationally symmetrical shape as viewed in the first direction of the bus bar plate and the battery stack being disposed side by side.

* * * * *